Jan. 9, 1934. R. H. PETERS 1,942,900

DEODORANT ATTACHMENT FOR COOKING UTENSILS

Filed April 23, 1932

Inventor,
Robert H. Peters,
by Walter P. Geyer
Attorney.

Patented Jan. 9, 1934

1,942,900

UNITED STATES PATENT OFFICE 1,942,900

DEODORANT ATTACHMENT FOR COOKING UTENSILS

Robert H. Peters, Buffalo, N. Y.

Application April 23, 1932. Serial No. 607,151

7 Claims. (Cl. 53—1)

This invention relates to certain new and useful improvements in cooking utensils.

One of its objects is to so design the utensil as to prevent the escape of disagreeable odors which are emitted from certain kinds of foods while being cooked.

Another object of the invention is to provide a cover or lid for kettles and like cooking utensils having simple and inexpensive means embodied therein for absorbing and collecting the disagreeable and obnoxious odors and smoke emanating from the foods being cooked, and whereby their escape into the room is effectually prevented.

A further object of the invention is to provide a lid or cover of this character having means embodied therein for receiving a liquid or fluid deodorant, and which means is so designed that the deodorant is positively prevented from contaminating or in any way coming in contact with the food being cooked.

In the accompanying drawing:—

Figure 1:
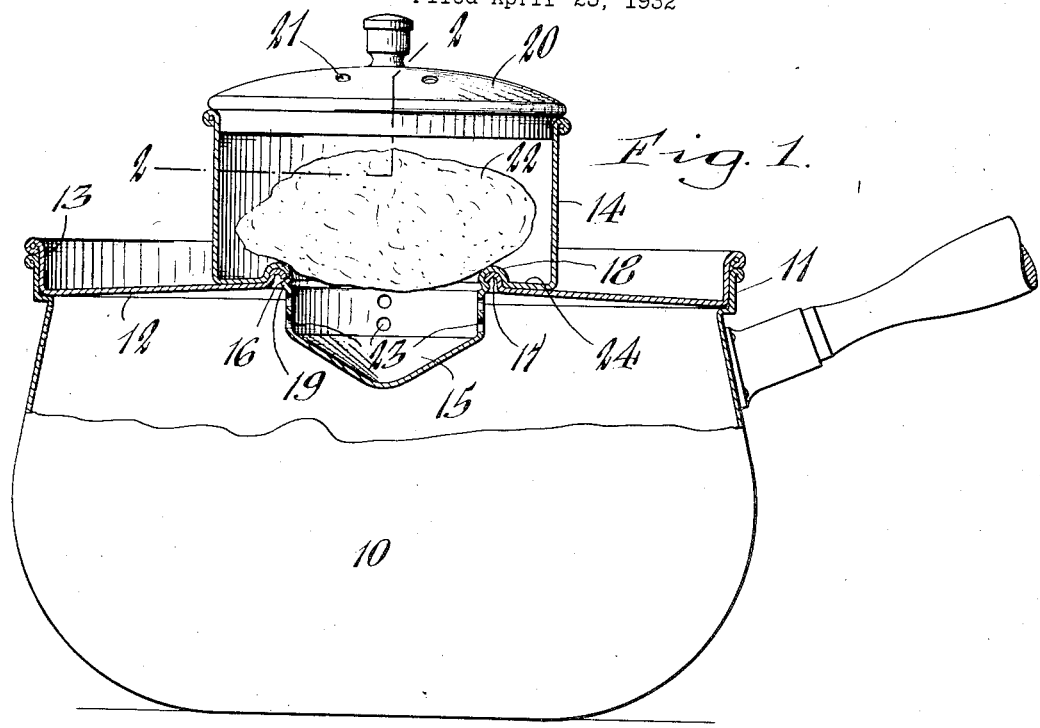
Figures 2, 3:
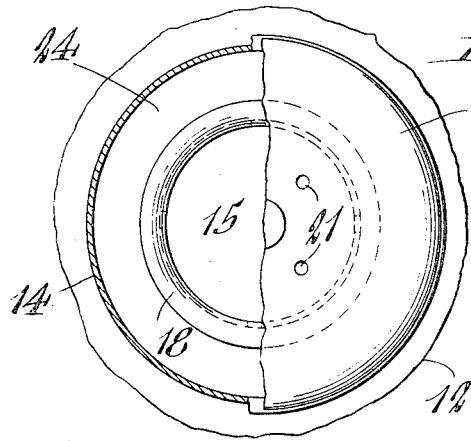
Figures 4, 5:
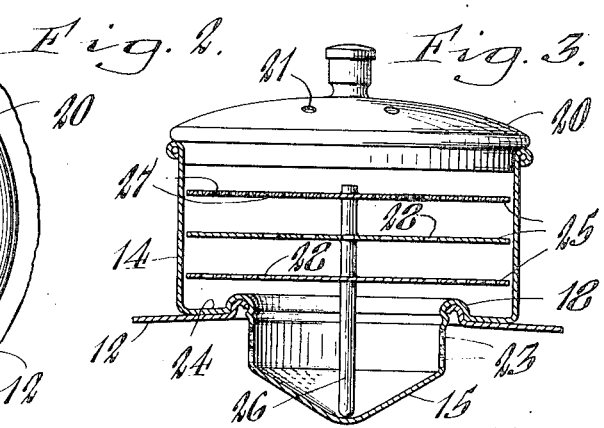

Figure 1 is a sectional side elevation of a cooking utensil embodying my invention. Figure 2 is a horizontal section taken in the plane of line 2—2, Figure 1. Figure 3 is a vertical transverse section through the deodorant chamber of the lid or cover showing a modified form of the invention. Figure 4 is a top plan view of the deodorant or baffle unit shown in Figure 3. Figure 5 is a fragmentary vertical section of another modified form of the invention.

Similar characters of reference indicate corresponding parts throughout the several views.

Referring now to Figures 1 and 2 of the drawing, 10 indicates a kettle or like cooking utensil having a substantially upright cover-engaging flange 11 at its upper edge, and 12 indicates a cover having a similar marginal flange 13 adapted to snugly fit the corresponding flange 11 of the kettle so as to form a snug and practically fluid tight seal therewith.

Applied to the cover is a smoke-consuming and deodorant chamber which preferably consists of a substantially cup-shaped member or receptacle 14 having a communicating extension forming a fluid collector or condensing chamber 15 depending from its bottom and preferably of somewhat smaller dimensions than the receptacle 14. At its center the cover has an opening 16 through which the extension 15 extends and its marginal edge is shaped in the form of a bead 17 with which a companion bead 18 rising from the bottom of the receptacle 14 is adapted to interlock for securely fastening the receptacle in overlying relation to the cover. Below the bead 18 is an annular, outwardly-projecting bead 19 which is adapted to interlock beneath the opposing edge of the cover bead 17 in the manner shown in Figure 1. A suitable lid or closure 20 is removably applied to the top of the receptacle 14 and is provided with vents 21 for the escape of the deodorized fumes and steam.

Removably arranged in the chamber 14 is a combined deodorant and smoke-consuming element 22 which is preferably in the form of a sponge or like absorbent material capable of retaining fluid or moisture. This absorbent element is preferably a non-oxidizable material and in practicing my invention I have found copper wool or a metallized wool coated with copper to be very satisfactory. This material not only affords an effective consumer for smoke-giving foods but it also possesses the required absorbent quality to retain a fluid deodorant of any appropriate form which the housewife usually has on hand and with which it is more or less saturated for absorbing the disagreeable or obnoxious odors emitted when cooking such foods as cauliflower, cabbage, onions, etc.

In its sides and above the substantially conical bottom thereof, the chamber-extension 15 has ports or openings 23 through which the odors and vapors emitted from the foods are directed to the deodorant chamber 14, the absorbent element 22 bridging or being disposed directly over the mouth of such extension whereby the vapors issuing from the food are obliged to come into intimate contact therewith. The conical bottom of this extension 15 constitutes a collector for the condensed steam and vapors as well as for any excess of the fluid deodorant applied to the absorbent element. The upstanding bead 18 in the bottom of the receptacle 14 forms with the adjoining bottom and side wall of the latter, an annular recess or groove 24 which also serves as a well for receiving any products of condensation or into which any excess of the deodorant fluid may be discharged.

In the modified form of the invention shown in Figures 3 and 4, a screen-like deodorant device or baffling arrangement which is disposed in the chamber 14, which not only acts as a holder or suspension element for the deodorant fluid but which also acts to retard the flow of steam and other vapors issuing from the cooked foods whereby the same are absorbed by the fluid held in suspension by this arrangement. This device may consist of a plurality of vertically spaced disks 25 which are of a diameter to fit substantially snugly within the chamber 14 and which are mounted on a suitable stem 26 resting at its lower end on the conical bottom of the chamber-extension 15. The upper disk is provided with comparatively fine perforations 27, while the lowermost disks are provided with somewhat larger perforations 28 disposed out of registration with one another, as shown, to afford a baffling or retarded flow of the vapors upwardly through the chamber and thereby cause intimate contact of these vapors with the deodorant fluid held in a film-like fashion on the perforated disks. These disks are made of or are coated with a non-oxidizable metal or like material and in practice approximately a tablespoonful of any deodorant fluid, such as vinegar or the like, is poured onto the uppermost disk and percolates slowly through the lowermost disks where it may finally drip into the annular recess 24 at the bottom of the chamber 14 or into the conical collector 15.

The modification of the invention shown in Figure 5 is substantially like that shown in Figures 3 and 4 and consists of a finely perforated upper disk 29, a perforated intermediate disk 30 and a lower substantially conical-shaped disk 31 having a depending annular flange 32 at its bottom which rests at its lower edge in the annular recess 24 of the chamber 14. In this case the fluid deodorant percolates through the disks 29 and 30 and thence finds its way through direction by the conical disk 31 to the annular recess 24 which constitutes a well for receiving the fluid deodorant. In its lower edge the conical disk flange 32 has notches or openings 33 therein which serve as outlets for the vapors issuing from the food, these outlets 33, in the normal operation of the device, being disposed below the level of the deodorant fluid in the recess 24 so that the obnoxious fumes issuing from the food must pass through the deodorant fluid and are thereby deodorized before escaping outwardly through the chamber 14.

In all forms of my invention heretofore described, any disagreeable odors emitted by the foods being cooked are effectually absorbed, thereby eliminating the nuisance of filling one's kitchen and other rooms of the home with offensive and obnoxious odors. Furthermore, the construction and arrangement of parts is such that they may be readily cleaned and kept sanitary, and the foods cooked without danger of being contaminated with the deodorant material, which, being fluid, is easy to handle.

I claim as my invention:

1. A device of the character described, comprising a cover for a cooking utensil having a chamber containing openings for the passage of the fumes from the food being cooked into said chamber and from the latter into the atmosphere, fluid-deodorant receiving means arranged in said chamber for intercepting the fumes emitted from the cooked food, and means for receiving any surplusage of the fluid-deodorant and preventing its entrance into the utensil.

2. A device of the character described, comprising a cover for a cooking utensil having a chamber containing openings for the passage of the fumes from the food being cooked into said chamber and from the latter into the atmosphere, and fluid-deodorant means arranged in said chamber for intercepting the fumes emitted from the cooked food, said chamber having fluid-receiving portions therein for intercepting and preventing the deodorant fluid entering the utensil, said chamber-openings being so positioned with relation to the fluid-receiving portions to prevent the flow of fluid therethrough into the cooking utensil.

3. A device of the character described, comprising a cover for a cooking utensil having a chamber including a portion above the cover and a communicating extension below the same having a passage therein for the fumes issuing from the food being cooked, and a deodorant-absorbing element arranged in the upper portion of said chamber and extending across the mouth of its extension for intercepting and deodorizing the fumes from the cooked food.

4. A device of the character described, comprising a cover for a cooking utensil having a chamber including a communicating extension having a passage therein for the fumes issuing from the food being cooked, and a fluid-sustaining deodorant element arranged in said chamber and extending across the mouth of its extension for intercepting and deodorizing the fumes issuing from the cooked food, said extension being closed at its bottom and having its passage disposed above the same.

5. A device of the character described, comprising a cover for a cooking utensil having an opening therein, a chamber applied to said cover and having a communicating neck-like extension projecting through said opening, said extension being closed at its bottom and having ports therein above said bottom for the passage of the fumes issuing from the food being cooked, and means arranged within said chamber across the mouth of its extension for intercepting and deodorizing the fumes from the cooked food.

6. A device of the character described, comprising a cover for a cooking utensil having a chamber containing openings for the passage of the fumes from the food being cooked into said chamber and from the latter into the atmosphere, and means in said chamber for intercepting and deodorizing said fumes, said means consisting of a plurality of foraminous elements through which a fluid deodorant is adapted to percolate, and means for intercepting said fluid when it reaches the bottom of the chamber and for preventing its passage into the utensil.

7. A device of the character described, comprising a cover for a cooking utensil having a chamber through which the fumes from the food being cooked pass, said chamber having an annular recess in its bottom, and means in said chamber for intercepting and deodorizing said fumes, said means consisting of a plurality of foraminous elements through which a fluid deodorant is adapted to percolate, and a fluid-deflecting element below said foraminous elements and terminating at its periphery in a depending flange overlying said chamber-recess and having fume-discharge ports therein.

ROBERT H. PETERS.